3,034,998
STOP LEAK COMPOSITION CONSISTING OF GROUND NUT SHELLS, CASTOR OIL AND POLYVINYL ALCOHOL
Virgil O. Hatch, Aberdeen, Md., assignor to the United States of America as represented by the Secretary of the Army
No Drawing. Filed Sept. 2, 1960, Ser. No. 53,847
2 Claims. (Cl. 260—17.4)
(Granted under Title 35, U.S. Code (1952), sec. 266)

The invention described herein may be manufactured and used by or for the Government of the United States for governmental purposes without the payment to me of any royalty thereon.

This invention relates to a stop-leak composition for use in the cooling system of engines, automobile radiators, boilers and the like.

Compositions which are known as stop-leaks consist essentially of a filler and a binder. Binders heretofore used in these formulations required the presence of air to convert them or render them cement-like in hardness. It is almost impossible to obtain a satisfactory seal in wet sleeve-type engines at the O-ring with the known stop-leak preparations, since the stop-leak composition is in constant contact with hot oils and oil vapors from the crankcase and little air is present. Other types of stop-leaks swell to form a seal and do not depend upon a binder as a sealing agent. Compositions of this type depend solely upon the ability of the filler to enter holes and cracks. These compositions often become ineffective after sealing due to disintegration of the filler particles.

A primary object of this invention is to prepare a highly effective stop-leak or anti-seepage composition which avoids the above noted disadvantages.

Another object of my invention is to provide a stop-leak composition particularly suitable for use in the cooling system of internal combustion engines.

A further object of my invention is to provide a stop-leak composition for effectively sealing around the O-ring of wet sleeve-type engines, to prevent seepage of the coolant into the crankcase and combustion chambers and which does not deepnd upon air for adequate functioning.

Another object of my invention is to develop a material which will seal porous areas of openings in the engine block on the coolant side, which otherwise would permit the coolant to exude through the walls of the engine block.

Still another object of my invention is to develop a material that will effectively seal small pin holes, cracks and crevices that occur in vehicle radiators and at the rubber hose connection between the radiator and engine block.

A further object of my invention is to provide a stop-leak composition that will blend well with known antifreeze solutions.

I have discovered that a stop-leak composition that comprises a mixture of a certain filler and binder successfully accomplishes the above listed objects and overcomes the disadvantages associated with known stop-leak compositions. This composition comprises a filler composed of ground nut shells and a binder consisting of polyvinyl alcohol. If desired, a minor amount of castor oil may be added to the mixture to prevent foaming and to reduce excessive dusting of the compostion. The components of this anti-seepage composition are blended together and added to the cooling system. A ratio of about one ounce of stop-leak composition for each four gallons of coolant has been found to be satisfactory. However, larger amounts of stop-leak may be necessary under some circumstances.

The filler used in this composition is ground nut shells. Different types of nut shells have been found to function satisfactorily with polyvinyl alcohol. However, it has been discovered that best results are obtained when ground almond and ground peanut shells are used either alone or admixed.

The shells are ground to a fine particle size. Preferably they are of a size that are capable of passing through approximately a No. 20 sieve and retained on about a No. 80 sieve.

A critical feature of this invention resides in the utilization of a binder consisting of water soluble polyvinyl alcohol in the composition. Water soluble polyvinyl alcohol will convert to the water insoluble form in the presence of water, if subjected to heating. The rate of the insolubilization reaction increases with increased temperature. Thus a permanent seal is produced in the system by virtue of the action of the critical binder, polyvinyl alcohol. Polyvinyl alcohol can penetrate into small holes, cracks and crevices and form a hard finish over these openings that does not wash away or disintegrate thereby preventing seepage.

Various grades of polyvinyl alcohol have been observed to function satisfactorily. However, foaming of the coolant is reduced to a minimum if completely hydrolyzed low viscosity grades of polyvinyl alcohol are employed.

The relative proportions of ingredients of the stop-leak composition may vary. Optimum results are obtained when the composition contains from 75 to 95 percent by weight of ground nut shells in combination with 5 to 25 percent by weight of polyvinyl alcohol.

The ground nut shells are comminuted to a finely divided condition. Preferably they are of a size range sufficient to pass through a No. 20 sieve and are retained on a No. 80 sieve.

The following example illustrates a specific embodiment of the invention:

*Example*

Percent by weight
Ground almond shells (sieve size—through No. 28, retained on No. 80) _____ 62
Ground peanut shells (sieve size—through No. 40, retained on No. 80) _____ 21
Polyvinyl alcohol (viscosity at 20° C., 4% water solution—4 to 6 centiposes, percent hydrolysis 98.5 to 100) _____ 14
Raw castor oil_____ 3

The ability of this composition to seal holes and cracks in cooling systems is very effective when used with both glycol-type antifreeze solutions and water. It has been observed that the mixture of ground nut shells and polyvinyl alcohol completely seals the cracks in a closed system. No leakage in the cooling ssytem occurred when that system was subjected to pressures and temperatures similar to those found in the cooling system of internal combustion engines. This composition prevents seepage of the coolant into the crankcase and combustion chamber of the engine. It also prevents the entrance of oil from the crankcase and combustion gases from the cylinders into the cooling system by effective sealing action.

I claim:

1. A stop-leak composition for the cooling system of an engine consisting of 3% by weight castor oil, 75 to 90% by weight of ground nut shells that pass through a No. 20 mesh sieve and are retained on a No. 80 mesh sieve, and the balance polyvinyl alcohol.

2. A stop-leak composition for the cooling system of an engine consisting of 3% by weight castor oil, 62% by weight of ground almond shells that pass through a No. 20 mesh sieve and are retained on a No. 80 mesh sieve, 21% by weight of ground peanut shells that pass through a No. 40 mesh sieve and are retained on a No. 80 mesh sieve, and the balance polyvinyl alcohol.

References Cited in the file of this patent

UNITED STATES PATENTS

| | | |
|---|---|---|
| 2,237,753 | Dangelmajer et al. | Aug. 8, 1941 |
| 2,612,486 | Cameron | Sept. 30, 1952 |